United States Patent [19]

Ueda

[11] 4,020,497
[45] Apr. 26, 1977

[54] CAMERA WITH FILM CASSETTE

[75] Inventor: Hiroshi Ueda, Nara, Japan

[73] Assignee: Minolta Camera Kabushiki Kaisha, Osaka, Japan

[22] Filed: July 23, 1974

[21] Appl. No.: 491,094

[30] Foreign Application Priority Data

Aug. 1, 1973   Japan ..................... 48-86948

[52] U.S. Cl. ................... 354/27; 354/29; 354/34; 354/83; 354/129; 354/147
[51] Int. Cl.² .......................................... G03B 7/14
[58] Field of Search ............. 354/83, 29, 30, 32, 354/33, 34, 50, 57, 26, 27, 129, 133, 137, 138, 139, 145, 147, 230, 234, 235

[56] References Cited

UNITED STATES PATENTS

| | | | |
|---|---|---|---|
| 3,529,526 | 9/1970 | Wick et al. | 354/147 |
| 3,538,827 | 11/1970 | Fuwa | 354/133 X |
| 3,630,128 | 12/1971 | Kitai | 354/33 |
| 3,638,545 | 2/1972 | Kobayashi et al. | 354/34 |
| 3,659,508 | 5/1972 | Urano | 354/138 |
| 3,683,768 | 8/1972 | Kitai | 354/33 |
| 3,687,026 | 8/1972 | Kobayashi et al. | 354/51 |
| 3,710,700 | 1/1973 | Nakano | 354/29 |
| 3,750,551 | 8/1973 | Land et al. | 354/83 |
| 3,757,655 | 9/1973 | Kobayashi | 354/29 |
| 3,763,752 | 10/1973 | Ackerman et al. | 354/33 |
| 3,785,259 | 1/1974 | Kitai | 354/34 |

*Primary Examiner*—Russell E. Adams, Jr.
*Attorney, Agent, or Firm*—Wolder & Gross

[57] ABSTRACT

A camera has a cavity for receiving a self-processing film cassette and includes an automatic exposure control circuit and a flash device which are provided with energizing contacts located in the cassette receiving cavity. The film cassette houses a battery connected to contacts mounted on the cassette and engaging the cavity contacts when the cassette is received in the cavity. The exposure circuit responds to a photosensitive element exposed to the objective traversing light reflected by the film at the objective focal plane. The camera includes a synchronous switch whose closing position responds to the focussing of the objective lens.

4 Claims, 4 Drawing Figures

CAMERA WITH FILM CASSETTE

BACKGROUND OF THE INVENTION

This invention relates generally to a camera, and more particularly to a camera of the type using film that is accommodated in a removable cassette.

Still more specifically, the invention relates to such a camera which includes electrically energizable components.

It is already known to provide cameras with built-in electronic flash devices having a flash circuit for firing the flash tube of the device. Cameras of this type have obvious advantages in terms of ease of operation, elimination of any need for separate flash bulbs, and the like. They are, however, rather large, due to the incorporation of the flash circuit and the power source —e.g. dry cells, rechargeable cells— needed to power this circuit. This makes such cameras much less portable than is desired.

However, this type of arrangement is known for 35 mm cameras and others using similar small film, that is cameras where the question of small size and light weight is of very considerable importance. This is a consideration which is of minor importance in the type of camera which uses self-developing film, of which the "Polaroid" cameras are an example. Because these cameras use film which, when exposed, develops directly within or immediately outside the camera, this film must have a size corresponding to that of the finished picture. This, in turn, means that the film cannot be small, and neither can the cassette be small in which it is supplied.

Therefore, the incorporation of electrically powered circuits in such a camera represents no particular problem, since the camera must be large to be able to operate with the large film, and the incorporation of the circuits will not add too much to the overall size and weight of such a camera.

There is, however, a problem with the electric energy for the circuit or circuits. The use of dry cells is preferred, because these are less expensive than the much more costly rechargeable cells. Dry cells, however, have some disadvantages. There are some types which tend to develop leaks, leading to corrosion of various camera components. Then, again, dry cells have a limited shelf life, which means that when they are left in a camera for some time the user may, on trying to operate the camera, find that the dry cells are no longer operative. Also, when the dry cells are left in the camera, even when the latter is not in use, there is always the possibility that the circuits powered by them might be accidentally triggered, resulting in the waste of at least one film negative.

SUMMARY OF THE INVENTION

It is therefore a general object of my invention to avoid the above-mentioned drawbacks of the prior art.

More expecially, it is an object of this invention to provide an improved camera which avoids these disadvantages.

In particular, it is an object of the invention to provide such an improved camera wherein dry cells may be used to operate one or more electrically energized circuits, but wherein the problems outlined above with respect to the prior art do not occur.

In keeping with these and other objects which will still become evident, my invention resides in a camera, particularly of the type using self-developing film, which comprises a camera housing, receiving means for a film cassette, retaining means for releasably retaining the film cassette in the receiving means, and electrically operated means in the housing and including electrically energized circuit means; a film cassette including a casing receivable in the receiving means, and a source of stored electrical energy in the casing. I further provide cooperating terminals on the casing and the housing which are conductively engageable with one another in response to insertion of the cassette into the receiving means, to thereby connect the energy source with the circuit means in automatic response to the insertion of the cassette into the receiving means.

This invention thus assures that the disadvantages of the prior art are overcome.

Since the energy source, i.e. dry cells, is located in the film cassette rather than in the camera housing itself, any leaks that might develop in one or more of the dry cells cannot damage the camera. At most, they can damage the film in the cassette. Moreover, since it is contemplated that the dry cells will be supplied as a part of each cassette, being calculated to supply just enough energy for a number of flashes corresponding to that of the number of pictures obtainable from the film in the cassette, a fresh set of dry cells will be available with every cassette.

As a rule, users of cameras employing self-developing film tend to use up all of the film in a cassette in a single photographic session. This is in part due to the fact that only a relatively small number of film negatives is supplied in each cassette. When the film is used up, the cassette is detached from the camera, thus de-energizing —when my invention is employed— the electrically powered components of the camera.

Moreover, my invention makes it possible to use a built-in electronic flash tube and the power circuit for the same, in a camera of the type in question, instead of using flash-bulb devices which must be mounted on and dismounted from the camera by the user, and where there is always the possibility that the electrical contacts might not be properly made during the mounting. I can also use an automatic exposure control circuit, and the fact that my dry cells will always be freshly supplied with each cassette assures that there are no incorrect indications from the exposure control circuit due to inadequate power from drained batteries.

In cameras of the type using self-processing or self-developing film, it is very difficult to obtain properly exposed prints, because the exposure latitude within which the exposure may vary is generally very restricted with this type of film. For this reason, cameras using this type of film are provided with a light-sensitive element which is part of the exposure control system but which must be capable of detecting the exposure light much more accurately than is the rule in conventional automatic exposure control circuits.

The prior-art cameras use a light-detecting optical system which is independent of the photographic optical system of the camera, a diaphragm disposed in the light-detecting system and interlocked with a diaphragm of the photographic system, and a light-sensitive element adapted to detect the light which passes through the diaphragm of the light-detecting system. This is, self-evidently, a rather complicated and expensive construction.

According to a further object of my invention, I provide a camera of the type in question which enable accurate detection of the exposure light with a much simpler and less costly construction.

Furthermore, in this type of camera, the focal length of the photographic lens is inevitably long, for the self-processing film has a large size. The diameter of the lens cannot, however, be increased so much because this leads to high manufacturing costs. The result is that the F number of the lens becomes large and that the light which exposes the self-processing film is weakened in intensity. Thus, even in a case where a subject to be photographed is not particularly dark, a properly exposed print cannot be obtained unless the subject is illuminated by the light of a flash. And also, as mentioned before, in the case of the self-processing film a properly exposed print cannot be obtained where the brightness of a subject is not uniform, because of the narrow exposure latitude of the film, unless the subject is illuminated by the light of a flash. Therefore the use of a flash device is more frequent with the case of this type camera than with 35 mm cameras.

However, conventional cameras of this type are so constructed that a flash lamp mounted thereon is fired by an electric signal synchronized with the shutter release actuation, when a manual member is selectively set to a flash position where the flash lamp is connected to a synchronizing mechanism within the camera. Thus, when the manual member is by mistake left at the flash position, the flash lamp is fired also in such photographing when the brightness of the subject would by itself be enough to obtain properly exposed prints, or when the photographic distance is so far that the light emitted from the flash lamp cannot illuminate the subject; in either case, the electric energy of the dry cells is wasted.

Accordingly, it is still a further object of the present invention to provide a camera of aforesaid type, in which an automatic control is accomplished in accordance with the brightness of the subject and the photographic distance, to determine whether an electronic flash tube is to be fired or not, even if the manual selecting member is set so as to enable the firing of the flash tube, so that unnecessary consumption of the electric energy of the dry cells is prevented.

The invention will be best understood from a perusal of the appended drawings and the following description thereof, which are directed to an exemplary embodiment on hand of which the invention will be explained.

BRIEF DESCRIPTION OF THE INVENTION

DESCRIPTION OF THE PREFERRED EMBODIMENT

Figure 1:
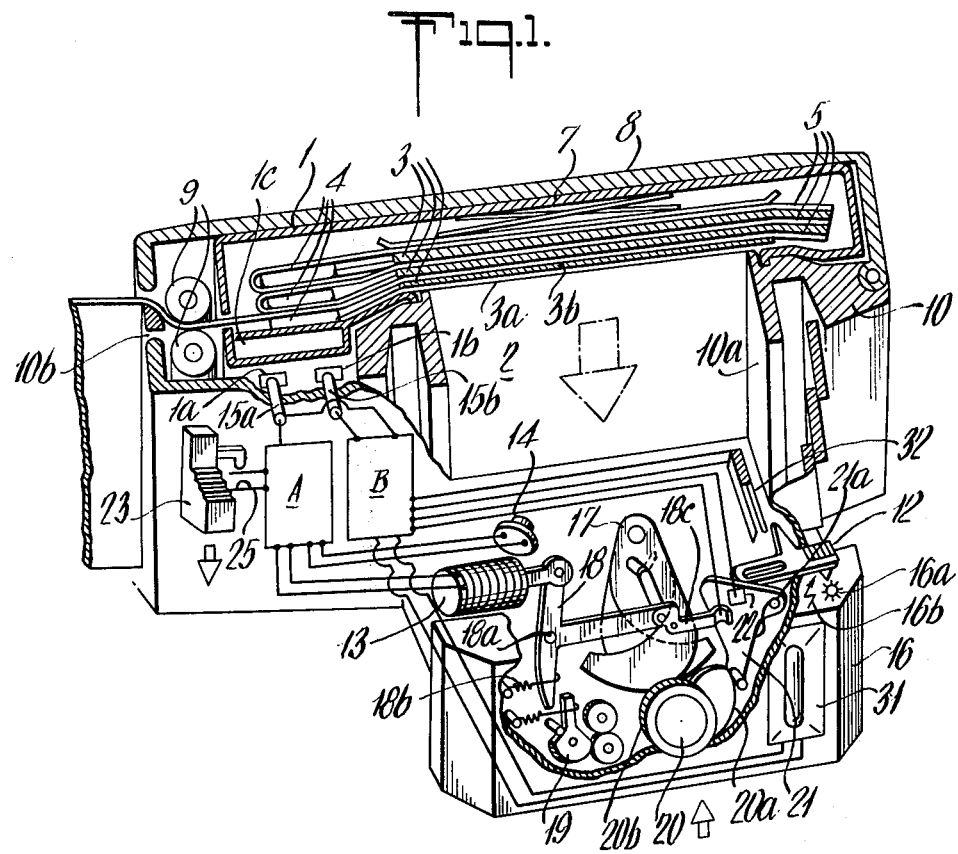
FIG. 1 is a partially sectioned fragmentary perspective, illustrating the lower half of a camera embodying my invention.

FIGS. 1 to 4 illustrate a single, exemplary embodiment of the invention. Reference number 1 identifies a magazine or cassette casing in which a plurality of self-processing negatives is accommodated. The term "negatives" is used in this description for convenience; it is evident that each self-processing film also includes as part of it the paper on which the print will appear. Each of the negatives 2 includes a photosensitive sheet $3a$ and an image-receiving sheet $3b$, which are superimposed on one another and thus form a "negative" or film. At one end of the film is located a bag or capsule 4 which accommodates processing liquid, and at the other end is located a bag 5 which receives processing liquid. The sheets $3a$ and $3b$, and the bags 4 and 5 together constitute the components in a unit which are required to make one photographic picture.

Several, for example ten, of these units 2 are housed in the cassette casing 1. To use one of these units 2, it is first exposed and then drawn leftwards (see FIG. 1) through the nip between two pressure rollers 9. This causes the liquid in bag 4 to be forced out of the same between the contacting surfaces of the sheets $3a$ and $3b$, thereby effecting developing and fixing of the photographic image.

The body of the camera is identified with reference numeral 10. The camera has an exposure frame $10a$ against which each of the film units 2 is urged by the action of a spring 7 that is provided within the casing 1 of the cassette and bears upon the film units 2. A cover of the camera is designated with reference numeral 8; it can be pivoted to open position, exposing a recess or receiver for the cassette in which the latter is inserted as shown in FIG. 1.

Located at the left-hand side (in FIG. 1) of the cassette casing 1 is a chamber that is formed in the casing and accommodates a set of dry cells $1c$. It is advantageous if these dry cells have an electrical capacity just sufficient to actuate the electrical components of the camera —e.g. the exposure circuit, a film transfer motor, a flash device— for a number of photographic operations which corresponds to the number of film units 2 in the cassette; in the present case, this would be ten operations.

Terminals $1a$ and $1b$ are provided on the casing 1 and connected with the dry cells $1c$. The camera body 10 is provided with corresponding terminals $15a$ and $15b$ which are so located that when the cassette is inserted into the receiver provided for it on the camera, its insertion will result in the automatic engagement of the contacts $1a$ and $1b$ with the contacts $15a$ and $15b$. The latter are connected with an automatic exposure circuit A and a circuit B are shown in block form in FIG. 1 for orientation; they will now be described in detail with respect to FIG. 2.

Figure 2:
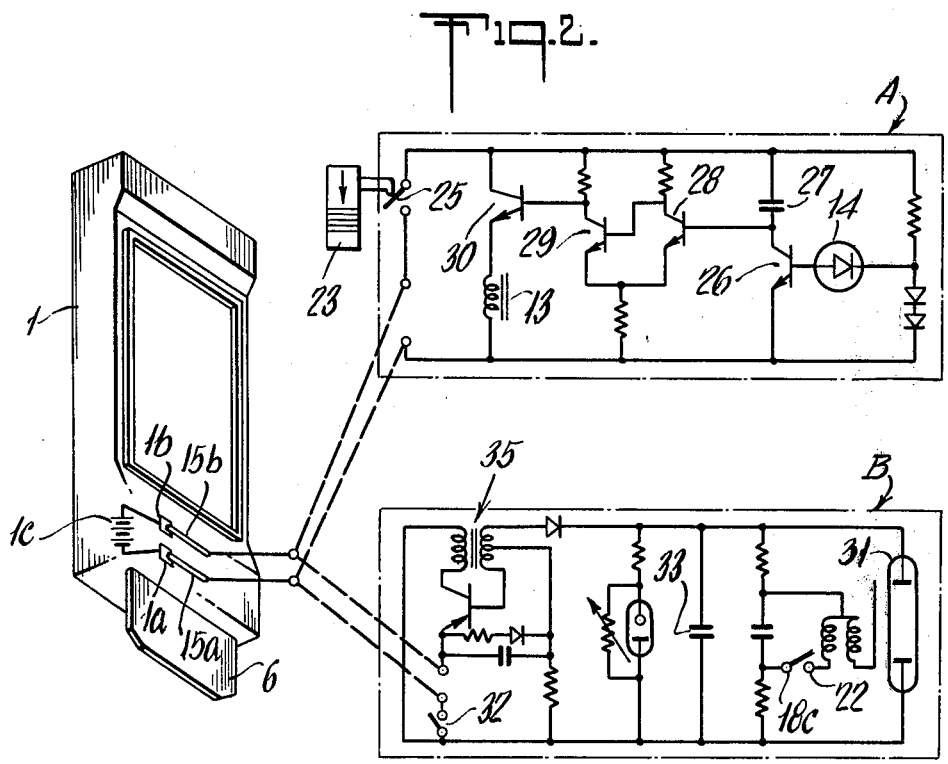
FIG. 2 is a circuit diagram, illustrating the electrical circuitry pertaining to the invention in the camera of FIG. 1.

In FIG. 2 I have chosen to show not only the circuit A and B, but for purposes of orientation also the cassette housing 1 with its associated components insofar as they affect the supply of electrical energy.

The circuits A and B are of conventional type, as FIG. 2 shows. A light sensing element is identified with reference numeral 14, and a shutter button which triggers the operation of the shutter of the camera, is identified with reference numeral 23. When pushed in the direction of the arrow, the button 23 closes a switch 25 to thereby actuate the automatic exposure circuit. When the switch is closed, an electromagnet 13 becomes energized and attracts a lever 18 for leftward pivoting movement (see FIGS. 1 and 3), which in turn moves shutter blades 17 to open position.

The leftward movement of the level 18 causes its lower end to bear against a governor mechanism 19 which brakes the pivoting movement of the lever 18 to thereby decelerate the movement of the shutter blades 17.

FIG. 1 shows that the light-sensing element 14 is located in the camera body 10 in facing relation to the film unit 2 that is ready to be exposed, in order to sense reflected light incident on the surface of the film unit 2. An electrical signal from the element 14 is supplied to a transistor 26 which converts the signal into a current for charging a capacitor 27. When the voltage level in the capacitor reaches a certain value, a switching circuit consisting of the transistors 28 and 29 is actuated and interrupts the supply of electric current to the electromagnet 13, so that the lever 18 is now abruptly pivoted back to its original position, due to the permanent biasing action of the spring 18b, thereby closing the shutter blades 17 immediately.

When it is desired to operate the flash device, the switch 32 of FIG. 2 is closed. When this is done, a high-voltage generating circuit 35 included in the flash circuit B is actuated and charges a capacitor 33 until the latter has stored enough electrical energy to fire a flash tube 31. Terminals 18c and 22 constitute a synchronizing switch.

Reference numeral 12 identifies a push button that can be set to select the operation of the flash device. A photographic lens of the camera is shown at 20; it can be shifted along its optical axis for focusing, by turning a focus adjusting member 20b.

Figure 3:
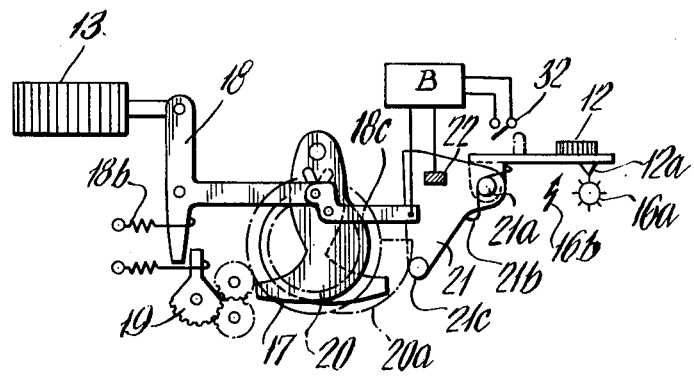
FIG. 3 is a somewhat diagrammatic front view, illustrating details of the shutter mechanism of the camera in FIG. 1.
Figure 4:
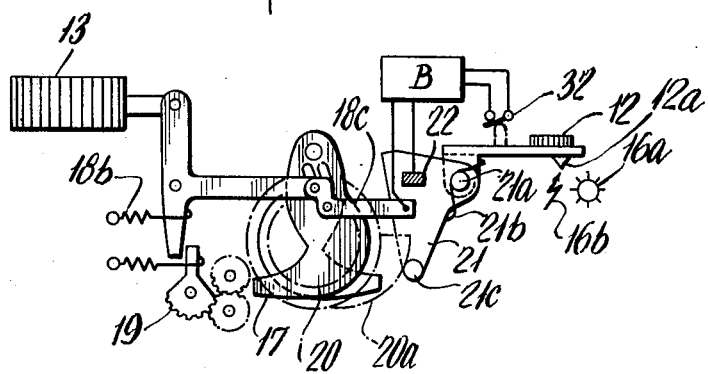
FIG. 4 is a somewhat diagrammatic front view, showing details of a synchronizing arrangement of the camera in FIG. 1.

FIGS. 3 and 4 should be considered in conjunction with FIG. 1 to understand the relationship between the push button 12, the switch 32, the synchronizing switches 18c and 22, and the shutter mechanism.

A cam 20a is integral with the turnable focus adjusting member 20b. A pin 21a mounts a triangular plate 21 for pivotal movement; then pin 21a itself is mounted on and moves with the manually-operated button 12 which can slide from left to right and vice versa in FIG. 3. A pin 21c projects from the plate 21 transversely thereof and abuts the cam 20a. A spring 21b bears upon the plate 20 and permanently tends to pivot the same in clockwise direction about the pin 21a.

A pair of indicia 16a and 16b is provided on the body 10 of the camera, and the button 12 can be shifted to place its indicator 12a so as to point either at 16a or 16b. If the button is set for the indicator 12a to point at indicium 16a, the switch 32 will be maintained open and the flash device remains de-energized. If, however, the button 12 is moved until its indicator 12a points at indicium 16b, such movement in leftward direction causes a shift of the pin 21a (which is mounted in button 12) in the same direction and a closure of the switch 32. The plate 21 and a contact portion 22 thereon therefore also move leftward (in FIG. 3) and the portion 22 enters the range of engagement of the end 18c of the long leg of the T-shaped lever 18, which serves as a movable contact. Therefore, when the lever 18 is attracted by the electromagnet 13 as described before, its pivoting movement will result not only in opening of the shutter blades 17, but also in upward counter-clockwise movement of the end 18c. If the indicator 12a is set to the indicium 16a, the triangular plate 21 will in its entirety be located far enough to the right so that during such movement there can be no contact between end 18c and portion 22, meaning that the synchronizing switch cannot close. If, however, the indicator 12a is set to indicium 16b, the portion 22 enters the range of engagement of the end 18c. The pin 21c bears upon cam 20a, which turns with the member 20b to an extent that depends upon how far the lens 20 must be axially shifted for focusing. If the lens 20 is being focused on a nearby object, the cam 20a will be turned in the counter-clockwise direction, thereby bringing its raised cam surface into engagement with the pin 21c, so that the plate 21 is urged in a sense displacing the portion 22 downwardly. The portion 22 thus makes contact with the end 18c when the electromagnet is energized, but before the shutter blades 17 are opened to a large extent. Thus, the more the lens 20 is shifted rearwardly to focus upon closer objects, the earlier will the flash discharge tube 31 be fired.

In a case where the whole object being photographed is dark, the portion 22 and the end 18c constituting the movable contact are able to contact one another until the beginning of the movement of the shutter blades 17 back to closed position, since the blades 17 have been opened to a large enough aperture by the exposure control circuit A, so that the flash discharge tube 31 will be fired even though the photographic lens should be focused on a more distant object.

In the event that the entire object is rather bright, the closing movement of the shutter blades 17 will occur before the portion 22 and the contact 18c can engage each other, since the shutter blades are not opened to a large enough aperture, even though the lens 20 may have been focused on a closer object. In this case, therefore, the flash discharge tube 31 cannot be fired, which has the advantage that waste of electrical energy is prevented.

In the event that the main object being photographed should be dark, whereas the background is bright, firing or non-firing of the flash discharge tube 31 is dependent upon the distance of the main object from the lens. If the lens 20 is focused on the main object, and the latter is located relatively close, contact between portion 22 and contact 18c is possible because it takes place earlier than the beginning of the closing movement of the shutter blades 17. The tube 31 will therefore be fired. If, however, the lens 20 is focused on a main object that is located relatively far away, the portion 22 and the contact 18c cannot engage one another because the shutter blades 17 return to closed position before the engagement can take place, so that the tube 31 will not be fired.

The camera according to the present invention thus overcomes the earlier-outlined disadvantages and offers the advantages which are sought by the invention. Since the flash tube and the flash circuit are incorporated into the camera, the user is saved the time and effort of mounting and demounting a flash gun assembly. There is no possibility that faulty contact might occur between the camera and the flash gun assembly. The location of the flash tube is fixed on the camera, according to the preselected angle of greatest flash effectiveness. The dry cells incorporated in the film cassette are replaced with fresh ones every time a fresh film cassette is put in place into the receiver. This eliminates the possibility of malfunction due to unexpected consumption of the dry cells during a period of non-use or even during a photography session at which many flash pictures are taken; it also precludes the possibility that the user might not be able to take a flash picture because, even though the camera contains film it does not contain batteries.

The invention has been described herein on the basis of a single exemplary embodiment. I wish it to be understood, however, that I do not intend the invention to be limited to the details of this embodiment, which serves merely an explanatory purpose, since evidently it is possible to make modifications within the concept of the invention.

What I consider novel, and desire to protect by Letters Patent, is set forth in the appended claims;

1. In a camera including:
an objective lens movable along its optical axis for focussing;
a shutter including movable blades relatively slowly movable from their closed to opened position to open said shutter and relatively rapidly movable from their opened to closed position to close said shutter;
means for opening said shutter in response to shutter release operation;
light sensitive means for generating an output commensurate with the brightness of an object to be photographed;
means for closing said shutter when a time period dependent on the output of said light sensitive means has passed after the opening of said shutter;
electronic flash means having an electronic flash tube and a firing circuit for firing said electronic flash tube;
a power source;
a power source switch manually operable to a closed position and an opened position and connected between said power source and said electronic flash means;
a synchronous switch which is closed to cause said firing circuit to fire said electronic flash tube when said shutter is brought into its open position, the improvement wherein said synchronous switch comprising:
a first contact movable with said movable blades; and
a second contact movable into and out of the path of said first contact respectively when said power source switch is in said closed position and in said open position, said second contact being additionally movable along said path of movement of said first contact in accordance with the position of said objective lens, whereby, when said power source switch is in said closed position, said first and second contacts engage one another during the movement of said movable blades toward their opened position with a timing which depends upon the position of said second contact along said path of movement of said first contact.

2. A camera as defined in claim 1, further comprising a camera casing in which a film is to be loaded, and wherein said electronic flash means is incorporated in said camera casing and said light sensitive means includes a photosensitive element disposed so as to receive the light which has traversed said objective lens and reflected at the surface of said film which is located at the focal plane of said objective lens when said shutter is in its open position.

3. A camera as defined in claim 2, wherein said film to be loaded in said camera casing is a self-processing film.

4. A camera as defined in claim 1, wherein said shutter closing means is so arranged as to bring said movable blades to their closed position until said first and second contacts engage one another when the intensity of the light received by said light sensitive means is higher than a predetermined level.

* * * * *